(12) United States Patent
Sandford (10) Patent No.: US 9,981,689 B2
(45) Date of Patent: May 29, 2018

(54) SELF-STEERING BOGIE FOR A ROAD VEHICLE

(71) Applicant: Geoffrey Paul Sandford, Artarmon (AU)

(72) Inventor: Geoffrey Paul Sandford, Artarmon (AU)

(*) Notice: Subject to any disclaimer, the term of this patent is extended or adjusted under 35 U.S.C. 154(b) by 513 days.

(21) Appl. No.: 14/424,219

(22) PCT Filed: Sep. 3, 2013

(86) PCT No.: PCT/AU2013/000997
§ 371 (c)(1),
(2) Date: Feb. 26, 2015

(87) PCT Pub. No.: WO2014/032124
PCT Pub. Date: Mar. 6, 2014

(65) Prior Publication Data
US 2015/0291213 A1      Oct. 15, 2015

(30) Foreign Application Priority Data

Sep. 3, 2012   (AU) .................................. 2012903808

(51) Int. Cl.
*B62D 53/06*   (2006.01)
*B62D 13/02*   (2006.01)
(52) U.S. Cl.
CPC .................... *B62D 13/02* (2013.01)
(58) Field of Classification Search
CPC ............................. B62D 13/02; B62D 13/025
USPC ......................................................... 280/426
See application file for complete search history.

(56) References Cited

U.S. PATENT DOCUMENTS

| | | | | |
|---|---|---|---|---|
| 2,502,946 A | * | 4/1950 | Hart ....................... | B62D 13/02 280/680 |
| 3,048,422 A | * | 8/1962 | Payne .................... | B62D 13/02 180/424 |
| 3,533,644 A | * | 10/1970 | Humes ................. | B62D 13/025 280/100 |
| 3,658,377 A | * | 4/1972 | Behrmann ............... | B64F 1/31 296/179 |

(Continued)

FOREIGN PATENT DOCUMENTS

| | | |
|---|---|---|
| GB | 1132930 | 11/1968 |
| SU | 1421595 | 9/1988 |

*Primary Examiner* — Joseph M Rocca
*Assistant Examiner* — Conan D Duda
(74) *Attorney, Agent, or Firm* — Welsh Flaxman & Gitler LLC (57) ABSTRACT

A self-steering bogie for an elongate road vehicle having at least a first axle assembly at the front end of the vehicle and at least one trailing axle assembly disposed on the vehicle behind said first axle assembly. The trailing axle assembly is a set of tandem axles with associated wheels disposed below a structural frame of the vehicle, the bogie comprising a rotatable sub-frame borne on the set of tandem axles which supports the vehicle by means of a load bearing turntable. A rotational restraint assembly is mounted on the turntable and which in part interconnects the sub-frame, the structural frame and an upper portion of the turntable, the rotational restraint assembly having a plurality of compression air springs. The elongate road vehicle could be a truck and semitrailer where the trailing axle assembly is on the semi-trailer, or a vehicle such as a bus.

25 Claims, 10 Drawing Sheets

(56) References Cited

U.S. PATENT DOCUMENTS

| | | | | |
|---|---|---|---|---|
| 4,090,581 A * | 5/1978 | Miner | B62D 5/06 | 180/403 |
| 4,161,325 A * | 7/1979 | Schneider | B60B 11/08 | 180/24.02 |
| 4,195,863 A * | 4/1980 | Richardson | B60G 9/00 | 280/124.109 |
| 4,603,873 A * | 8/1986 | Perlini | B62D 7/148 | 180/409 |
| 4,749,345 A * | 6/1988 | Warmuth | B29C 49/48 | 249/122 |
| 4,759,563 A * | 7/1988 | Nash | B62D 53/0864 | 280/407 |
| 5,035,439 A * | 7/1991 | Petrillo | B60G 5/04 | 280/149.2 |
| 5,183,283 A * | 2/1993 | Jarlsson | B60G 9/02 | 280/426 |
| 5,201,836 A * | 4/1993 | DeWitt | B62D 13/025 | 280/426 |
| 5,213,353 A * | 5/1993 | Williams | B62D 13/02 | 280/124.156 |
| 5,246,242 A | 9/1993 | Penzotti | | |
| 5,280,939 A * | 1/1994 | Kee | B62D 53/0864 | 280/411.1 |
| 6,152,475 A * | 11/2000 | Poole | B62D 13/00 | 280/426 |
| 6,341,251 B1 * | 1/2002 | Enomoto | B62D 7/144 | 701/41 |
| 6,604,753 B1 * | 8/2003 | Boyd | B62D 7/159 | 280/137.5 |
| 7,605,489 B1 * | 10/2009 | Blank | F03D 9/28 | 290/44 |
| 7,703,793 B2 * | 4/2010 | Kovach | B62D 53/0828 | 280/439 |
| 9,096,263 B2 * | 8/2015 | Prem | B62D 13/005 | |
| 9,555,831 B1 * | 1/2017 | Dahlstrom | B62D 53/06 | |
| 2004/0104555 A1 * | 6/2004 | Atley | B62D 13/025 | 280/426 |
| 2005/0012293 A1 * | 1/2005 | Misawa | B60G 17/052 | 280/124.157 |
| 2006/0261572 A1 * | 11/2006 | Biondi | B62D 13/025 | 280/432 |
| 2007/0267840 A1 * | 11/2007 | Sandbulte | B60G 11/27 | 280/124.157 |
| 2008/0048414 A1 * | 2/2008 | Van Mill | A01B 69/003 | 280/426 |
| 2010/0237573 A1 * | 9/2010 | Nommensen | A61G 3/065 | 280/6.151 |
| 2011/0231047 A1 * | 9/2011 | Aixala | B60T 17/02 | 701/22 |

* cited by examiner

SELF-STEERING BOGIE FOR A ROAD VEHICLE

TECHNICAL FIELD

The present invention relates to a self-steering bogie for a road vehicle. In particular, the present invention relates to a self steering bogie for a semi-trailer truck (articulated lorry) or bus.

BACKGROUND

An articulated road vehicle is a vehicle which has a permanent or semi-permanent pivoting joint in its construction, allowing the vehicle to turn more sharply. There are many types of articulated road vehicles and a most common type is the semi-trailer truck. In the semi-trailer truck, a trailer without a front axle, commonly referred to as a "semi-trailer", is coupled to a "prime mover", also commonly referred to as a truck or tractor.

The semi-trailers are substantially longer in length than the prime mover and provide a load-carrying tray or other payload means such as tank for liquids. The tray is generally supported by a plurality of a non-steerable (rigid) tandem axles located at the rear end of the semi-trailer. A turntable is provided at the front end of the semi-trailer for coupling with the prime mover. The turntable, sometimes termed a "fifth wheel", allows the trailer to articulate about a substantially vertical axis relative to the prime mover. This enables the semi-trailer to articulate thereby enabling the semi-trailer to turn around corners and otherwise manoeuvre along road networks.

Figure 1:
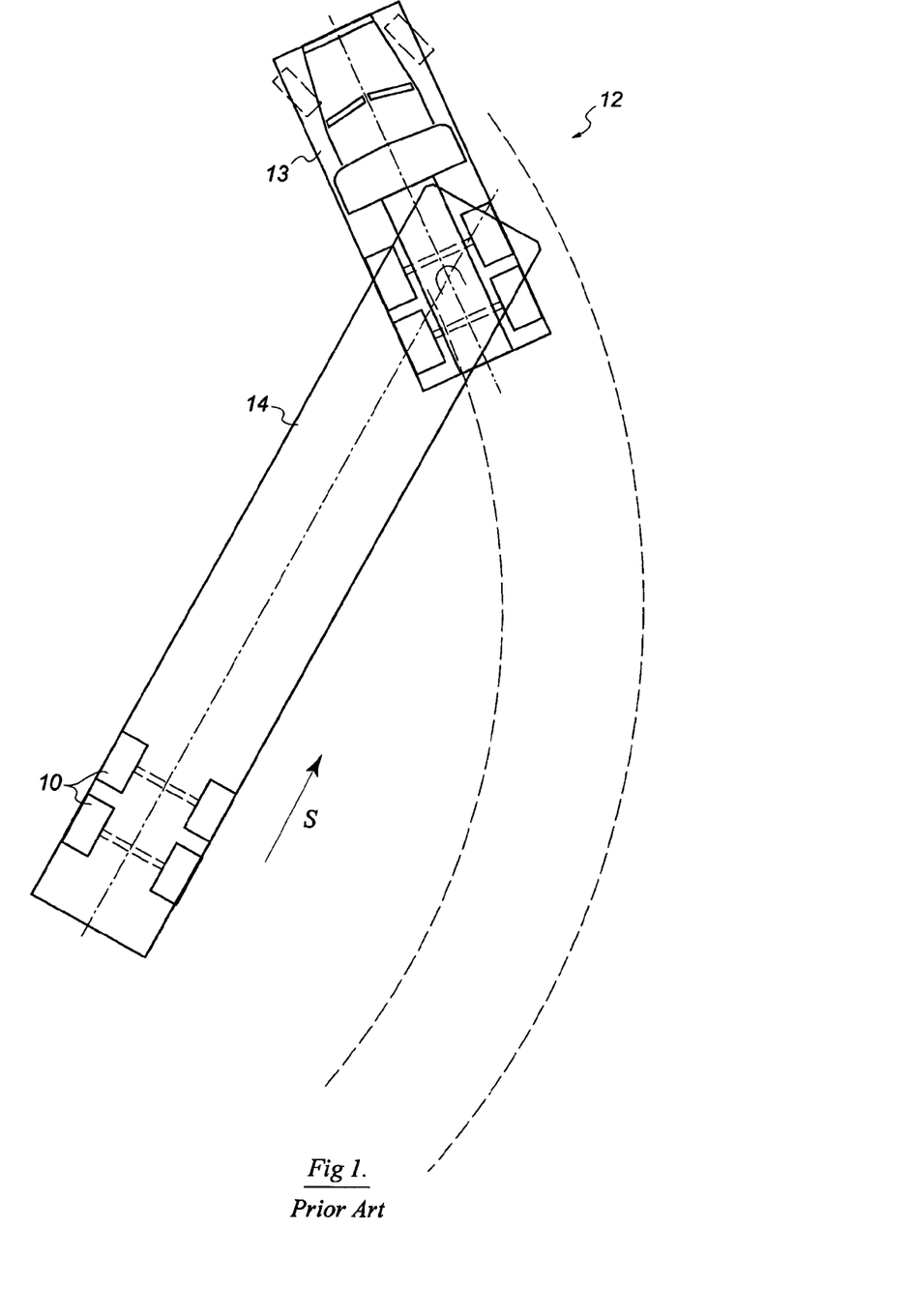
FIG. 1 is a schematic plan view of a prior art semi-trailer truck with non-steerable axles at the rear of the trailer, negotiating a sharp curve.

Semi trailer trucks typically have a semi-trailer maximum length of about 53 feet in the US, about 43 feet in Australia, and a slightly shorter maximum length in Europe. Due to the length of such semi-trailer trucks, it is difficult to carry out tight turns and manoeuvre in tight quarters, as is the case in many city and town intersections. The ability of such a semi-trailer truck to effect such turns is commonly indicated by the term "swept path performance". Sometimes these trucks will be crossing at least two lanes of the road to effect the turn. This is because the path followed by the wheels of the prime mover will be quite different to the path followed by the "non-steerable axle" wheels of the trailer in a phenomenon known as "off tracking". This results in what is known as "tyre scrubbing" where the tyres of the trailer axles are simultaneously rolled and dragged over the road surface. This leads to premature wearing of the tread portion of the tyres of the trailer wheels. With reference to FIG. 1, when such a prior art semi-trailer truck 12 with a prime mover 13 negotiates a turn, wheels 10 on rigid tandem axles of semi-trailer 14, have a tendency to move in the straight ahead direction shown by arrow S. This not only can cause problems with tyre wear, but affects the stability of the vehicle and safety to the driver and others in the surrounding environment, as the vehicle may be prone to "rolling" as it enters the turn. The stability problem is even more pronounced when the vehicle is fully loaded and the centre of gravity is higher, as for example is the case for a fully laden fuel tanker. Also the tendency of wheels 10 to want to move in the straight direction S, can in addition to tyre wear cause serious damage to roads.

Various attempts have been made to overcome the problem associated with the prior art, and some of these attempts are described in the "prior art" section of U.S. Pat. No. 7,219,913 (Atley), which is itself directed to an arrangement to improve the cornering characteristics (swept path performance) of an articulated vehicle. Many of the prior art arrangements are complex systems including mechanical and hydraulic components, which attempt to steer wheels on the trailer, and some require a prime mover which is significantly different to a conventional prime mover, making such arrangements costly and complex. While the arrangement in U.S. Pat. No. 7,219,913 comes some way to improve over the prior art, it is still a complex system which employs a steering mechanism on the trailer to steer wheels on a sub-chassis of the trailer.

A further prior art arrangement employing a driven steer carriage for use on a trailer is described in U.S. Pat. No. 7,726,423 (Atley). This arrangement utilises a power source to drive a pair of carriage wheels via a drive transmission. Whilst such arrangement may significantly improve the "swept path performance" of an articulated vehicle, it not only is a complex system, but also a costly one.

The present invention seeks to overcome at least some of the abovementioned disadvantages by providing a self-steering bogie for a road vehicle.

SUMMARY OF THE INVENTION

In a first aspect the present invention consists of a self-steering bogie for an articulated road vehicle having a truck and a trailer with at least two longitudinal members parallel to the longitudinal axis of said trailer, said bogie comprising:

a rotatable sub-frame borne on tandem axles with associated wheels which supports the rear end of said trailer by means of a load bearing turntable, wherein a rotational restraint assembly is mounted on said turntable and which in part interconnects said sub-frame, said longitudinal members and an upper portion of said turntable, said rotational restraint assembly having a plurality of compression air springs.

Preferably when said trailer is towed by said truck through a curve following a straight ahead direction, the increasing angle that the longitudinal axis of said trailer makes with said bogie having a tendency to roll straight ahead generates a resistant torque as a result of said air springs being compressed, thereby providing resistance sufficient such that said bogie will track in the path of said trailer.

Preferably said plurality of compression springs being at least four compression springs disposed circumferentially about said turntable.

Preferably each spring is associated with a quadrant of said turntable.

Preferably said upper portion of said turntable is rigidly attached to said two, longitudinal members and a lower portion of said turntable is connected to said sub-frame, and said lower portion of said turntable is rotatable with respect to said upper portion of said turntable.

Preferably a plurality of spaced apart upper brackets are disposed on said upper portion of said turntable, and a plurality of lower brackets are disposed on said lower portion of said turntable, and said compression air springs are constrained to compress by said upper brackets and said lower brackets.

Preferably at least one first upper outer rail is disposed substantially circumferentially on said upper portion of said turntable, and at least one second inner rail is disposed substantially circumferentially on said lower portion of said turntable, and said at least one first upper outer rail is used to slidably constrain one or more upper brackets and said at least one second lower inner rail is used to slidably constrain one or more lower brackets.

Preferably said compression air springs are operably connected to a variable volume air reservoir, and in use said compression air springs are open collectively in their connection to said variable volume reservoir, in order to attenuate the pressure increases caused by adiabatic compression associated with bogie rotation.

Preferably said variable volume reservoir is has air delivered to it from a main air reservoir of said vehicle.

Preferably said variable volume reservoir is operably connected to an electronic control unit which controls the amount of air delivered to said compression springs as a function of trailer payload and/or road condition.

Preferably said variable volume reservoir is operably connected to an air suspension system of said bogie via a pneumatic circuit.

Preferably said electronic control unit is operably connected to a steering lock mechanism disposed on said rotational restraint assembly.

Preferably each of said compression air springs are substantially made of a flexible material such as engineering grade rubber.

In a second aspect the present invention consists of a self-steering bogie for an elongate road vehicle having at least a first axle assembly at the front end of said vehicle and at least one trailing axle assembly disposed on said vehicle behind said first axle assembly, and said trailing axle assembly is a set of tandem axles with associated wheels disposed below a structural, frame of said vehicle, said bogie comprising:

a rotatable sub-frame borne on said set of tandem axles which supports said vehicle by means of a load bearing turntable, wherein a rotational restraint assembly is mounted on said turntable and which in part interconnects said sub-frame, said structural frame and an upper portion of said turntable, said rotational restraint assembly having a plurality of compression air springs.

Preferably when said elongate road vehicle moves through a curve following a straight ahead direction, the increasing angle that the longitudinal axis of said vehicle makes with said bogie having a tendency to roll in said straight ahead direction generates a resistant torque as a result of said air springs being compressed, thereby providing resistance sufficient such that said bogie will track in the path of said vehicle.

Preferably said plurality of compression springs being at least four compression springs disposed circumferentially about said turntable.

Preferably each spring is associated with a quadrant of said turntable.

Preferably said upper portion of said turntable is rigidly attached to said structural frame of said vehicle and a lower portion of said turntable is connected to said sub-frame, and said lower portion of said turntable is rotatable with respect to said upper portion of said turntable.

Preferably a plurality of spaced apart upper brackets are disposed on said upper portion of said turntable, and a plurality of lower brackets are disposed on said lower portion of said turntable, and said compression air springs are constrained to compress by said upper brackets and said lower brackets.

Preferably at least one first upper outer rail is disposed substantially circumferentially on said upper portion of said turntable, and at least one second inner rail is disposed substantially circumferentially on said lower portion of said turntable, and said at least one first upper outer rail is used to slidably constrain one or more upper brackets and said at least one second lower inner rail is used to slidably constrain one or more lower brackets.

Preferably said compression air springs are operably connected to a variable volume air reservoir, and in use said compression air springs are open collectively in their connection to said variable volume reservoir; in order to attenuate the pressure increases caused by adiabatic compression associated with bogie rotation.

Preferably said variable volume reservoir is has air delivered to it from a main air reservoir of said vehicle.

Preferably said variable volume reservoir is operably connected to an electronic control unit which controls the amount of air delivered to said compression springs.

Preferably said electronic control unit is operably connected to a steering lock mechanism disposed on said rotational restraint assembly.

Preferably each of said compression air springs are substantially made of a flexible material such as engineering grade rubber.

Preferably said elongate road vehicle is an articulated road vehicle having a truck and a trailer, and said first axle assembly at the front end of said vehicle is on said truck, and said trailing axle assembly is on said trailer.

Preferably said elongate road vehicle is a bus.

BRIEF DESCRIPTION OF THE DRAWINGS

A preferred embodiment of the invention will now be described, by way of example only, with reference to the accompanying drawings in which:

FIG. 7b is an end view of variable volume reservoir shown in FIG. 7a.

BEST MODE OF CARRYING OUT INVENTION

FIGS. 2 to 9 depict a preferred embodiment of self-steering bogie 30 in accordance with the present invention.

Self-steering bogie 30 is for use on a semi-trailer truck 22 made up of a prime mover (truck) 23 and semi trailer (trailer) 24.

Structural members 4 are elongate parallel members which form part of the structural frame of semi-trailer 24, and are disposed parallel to the longitudinal axis L of semi-trailer 24. In FIGS. 2 to 5 the other parts of trailer 24, including the frame and tray and other upper components are omitted for clarity and ease of reference.

Self-steering bogie 30 comprises a sub-frame 35 borne on conventional tandem axles 16 associated with wheels 17 (omitted from FIGS. 2-4 and FIG. 6 for ease of reference), via air suspension 20 which supports the rear end of semi-trailer 24 by a load bearing turntable 18. Sub-frame 35 is rotatable relative to longitudinal structural members 4 of semi-trailer 24. This rotation of sub-frame 35 is achieved by turntable 18, which has an upper portion 7 and a lower portion 8, best shown separately in FIGS. 5 and 6 respectively. Turntable upper portion 7 is rigidly attached to structural members 4 of trailer 24, and turntable lower portion 8 is connected to sub-frame 35.

Self-steering bogie 30 also comprises rotational restraint assembly (or torsional restraint system) 25 which forms part of the assembly of turntable 18. Rotational restraint assembly 25 comprises four compression air springs 5a-5d, each disposed circumferentially in a quadrant of turntable 18.

Preferably each of compression air springs 5a-5d is an "elongate curved bellows" made up of three segments connected "in series" and made of a flexible material such as engineering grade rubber. Each of the abovementioned segments may preferably be a commonly available pneumatic component, known as a "double convolute air spring" style #26 (part no. WO13587327), which is manufactured by Firestone Industrial Products. This "double convolute air spring" has end plates (not shown) with fasteners and air inlets, which allows it to be the segment, three of which are connected in series to form air springs 5a-5d. Where such Firestone "double convolute air springs" are used as the three segments, it is necessary to interconnect them using "mating plates" (not shown) which include "slide guides" (not shown).

Figure 3:
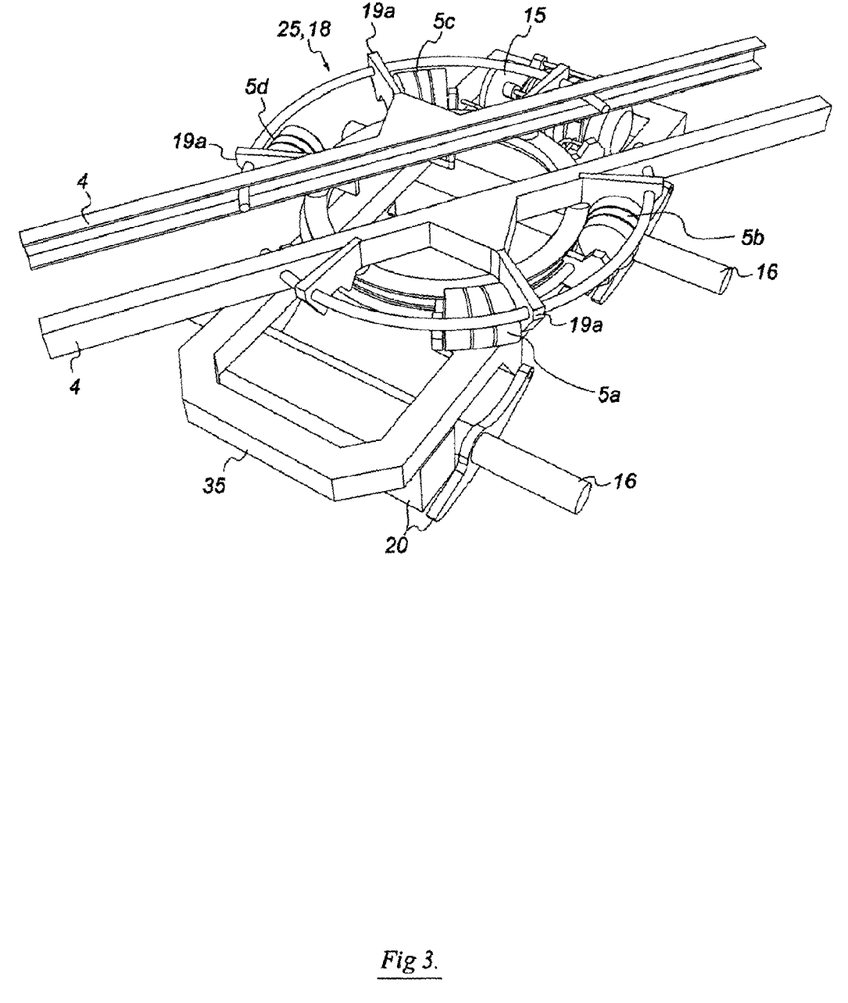
FIG. 3 is a perspective view of the self steering bogie assembly of FIG. 2, where the tandem axles are in a rotated orientation.
Figure 4:
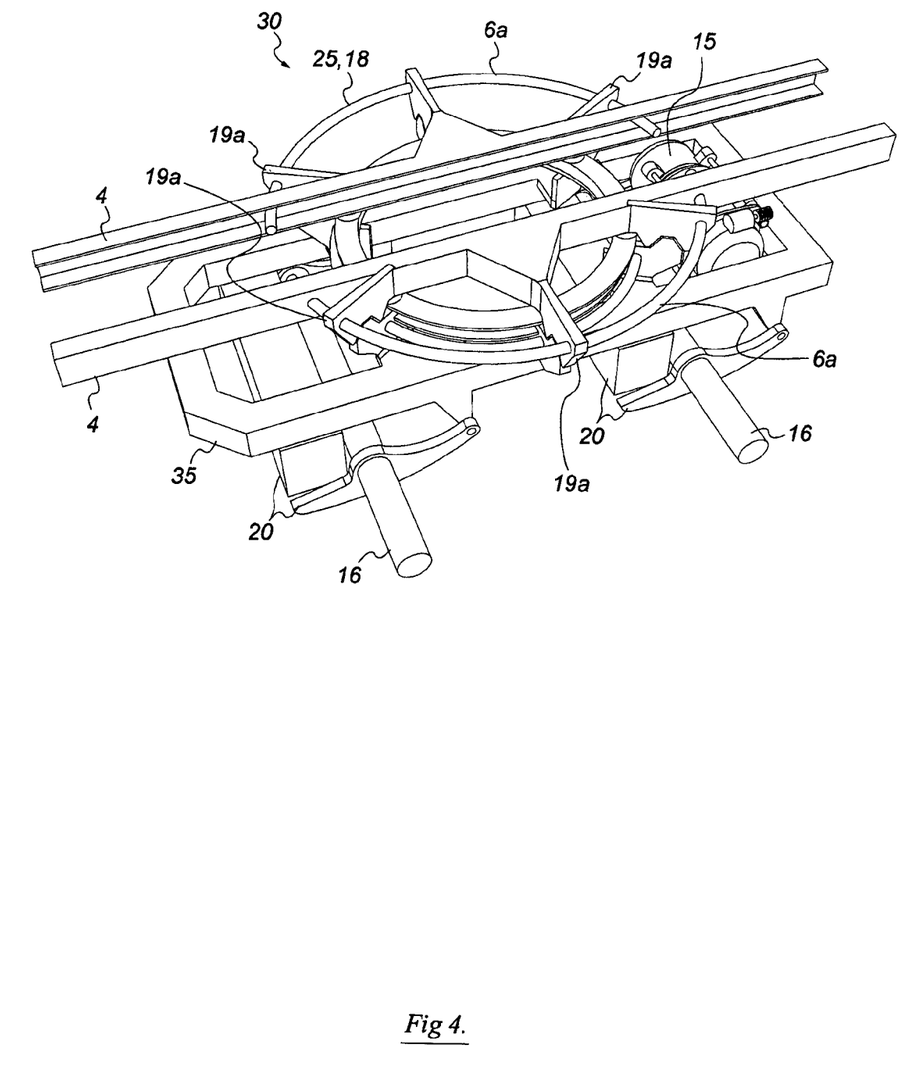
FIG. 4 is a perspective view of the self steering bogie assembly where the tandem axles are in a straight ahead orientation of FIG. 2, but with the compression air springs removed.
Figure 5:
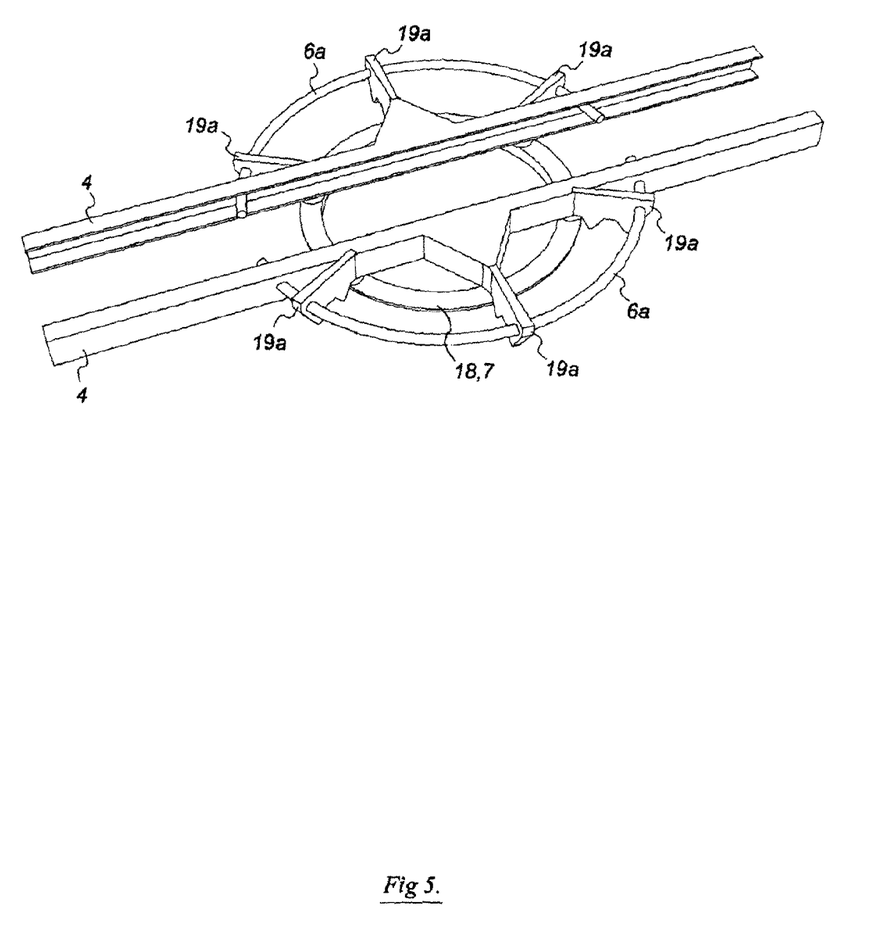
FIG. 5 is perspective view of the turntable upper portion of the self-steering bogie assembly and longitudinal members shown in FIG. 2.
Figure 6:
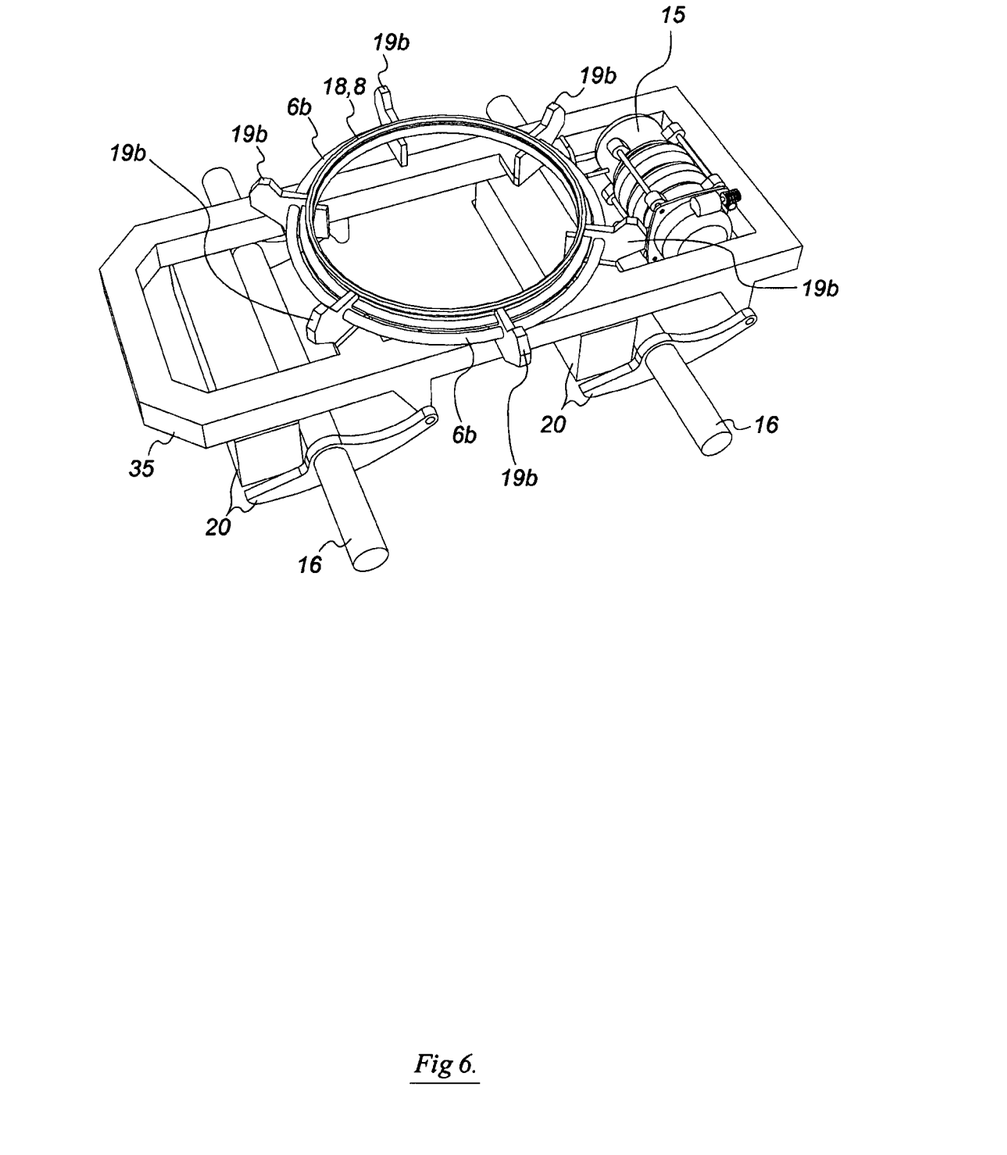
FIG. 6 is perspective view of the turntable lower portion of the self-steering bogie assembly and sub-frame shown in FIG. 2.

Springs 5a-5d can be compressed in a convolute manner as shown in FIG. 3. In overall curved length, each spring 5a-5d using the abovementioned Firestone component for each of the three segments, would in its "relaxed state" be about 685 mm.

Each of compression air springs 5a-5d are connected to variable volume reservoir 15 which in turn is supplied by the air from the main air reservoir 26 on trailer 24. Reservoir 26 is preferably the reservoir that also supplies air to the conventional air brake system (not shown) of semi-trailer 24.

Compression air springs 5a-5d are each constrained to compress by sets of upper and lower brackets (plates) 19a and 19b. There are six upper brackets 19a disposed and fixed on upper portion 7 of turntable 18, and six lower brackets 19b disposed and fixed on the lower portion 8 of turntable 18. These upper and lower brackets 19a,19b are respectively slidably constrained by "upper outer" tubular rails 6a and "lower inner" tubular rail 6b. Upper outer tubular rails 6a form part of turntable upper portion 7 and are attached to structural members 4, whilst the "lower inner" tubular rail 6b forms part of turntable lower portion 8.

The upper brackets 19a and lower brackets 19b constrain compression and expansion of springs 5a-5d along a circumferential path. During compression there is a tendency for springs 5a-5d to extend outwardly, and in order to prevent this outward excursion of the compressed flexible rubber material, it is preferable to include a plurality of "spacers" (not shown), each including "slide guides" which slidably engage with upper and lower rails 6a,6b. These "spacers" have been omitted from the figures for ease of clarity so that the importantly the relaxed and compressed states of the springs 5a-5d can be readily seen in FIGS. 2 and 3.

In particular, this configuration of rotational restraint assembly 25 with its various constrained elements, causes springs 5a-5d to be compressed as respective engaging brackets 19a,19b close in as sub-frame 35 rotates through about 40° either side of straight ahead, best shown in FIG. 3.

Rotational restraint assembly 25 is also provided with servomechanism components. Initial pressures in springs 5a-5d (ie in the straight ahead position) are based upon pressures in the system of air suspension 20, varying according to the amount of payload on semi-trailer 24 and its contribution to wheel loads imposed by bogie 30.

Figure 8:
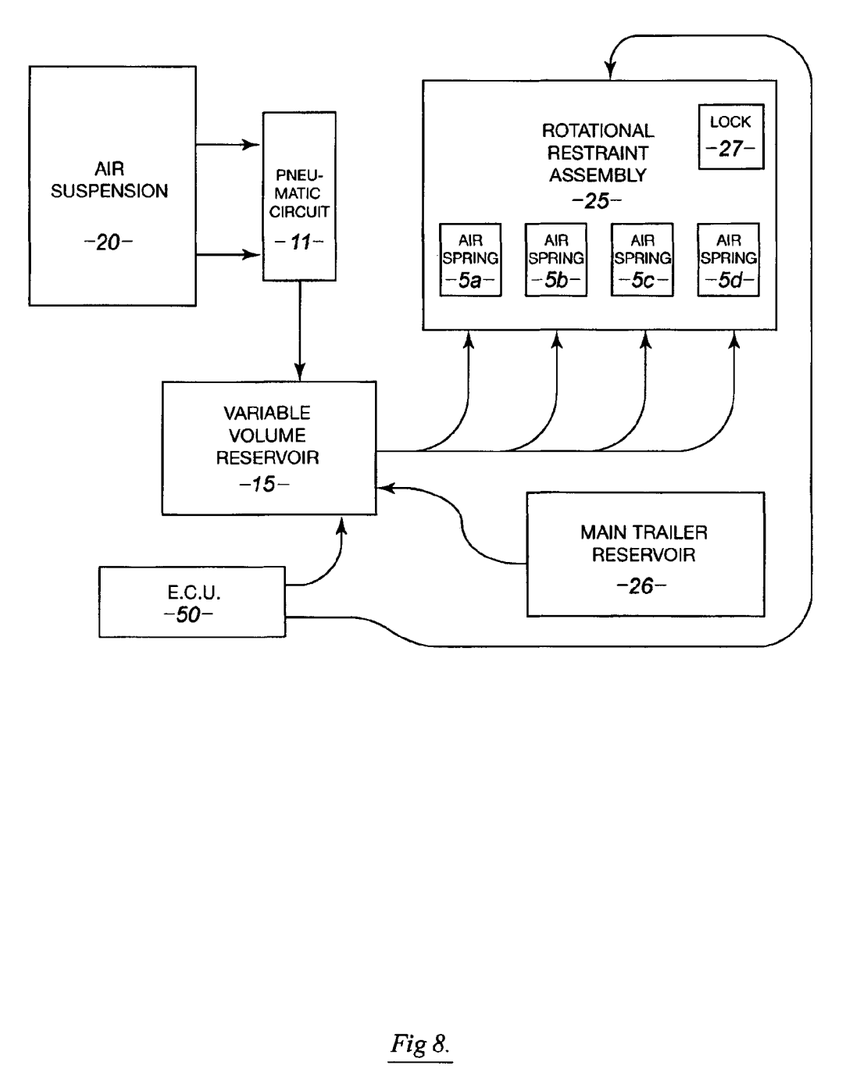
FIG. 8 is block diagram of various pneumatic/electronic components used to operate the self-steering bogie of FIG. 2.
Figure 9:
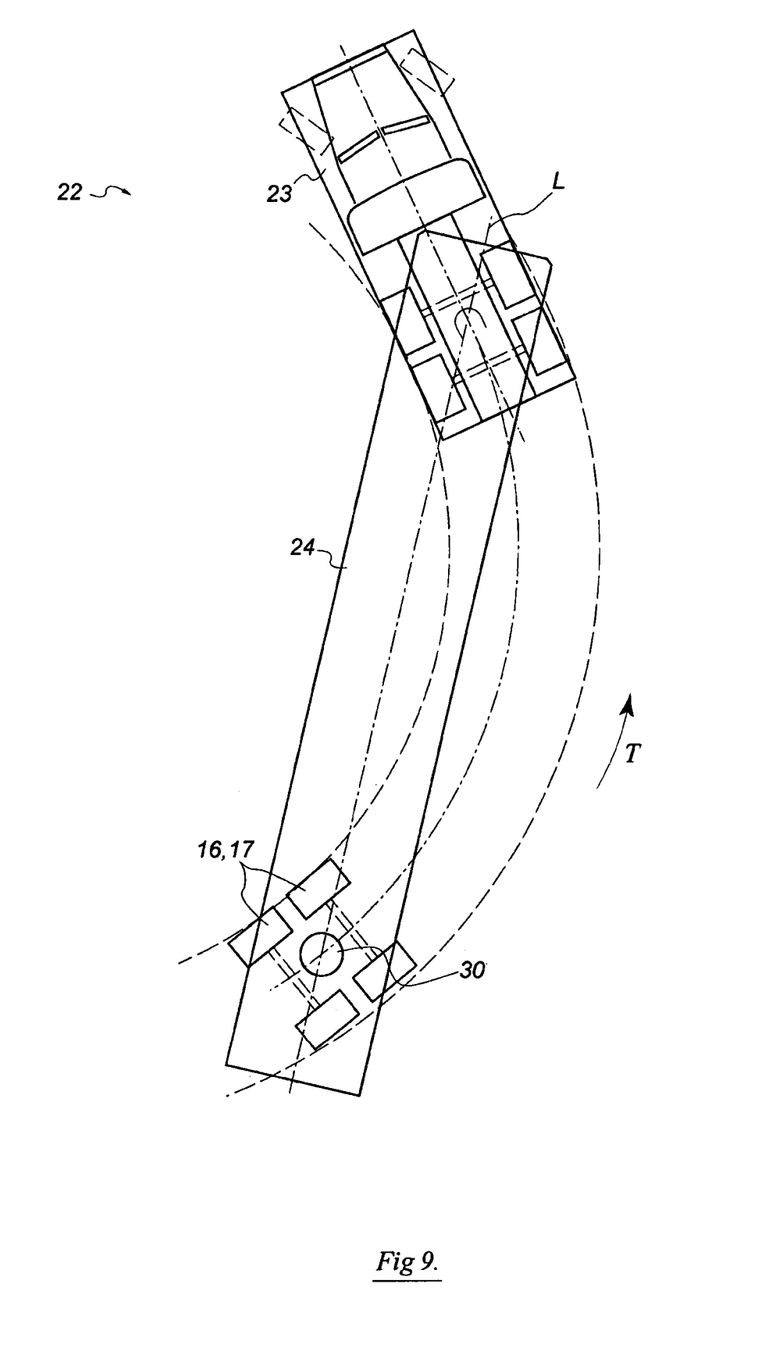
FIG. 9 is a schematic plan view of a semi-trailer truck with a self-steering bogie of FIG. 2 at the rear of the trailer, negotiating a sharp curve.

Referring to FIG. 8, a pneumatic circuit 11, preferably comprising two sub-reservoirs (not shown) serve the air suspension 20 on each side of bogie 30 via a pressure average device (not shown). The air is delivered from the main reservoir 26 to pneumatic circuit 11 via variable volume reservoir 15. The amount of air introduced into air suspension 20 via pneumatic circuit 11 will vary for a particular payload condition, and the electronic control unit (ECU) 50 will control this parameter. This will be set up at the commencement of a journey when the payload is first placed on semi-trailer 24, and will not be altered once the journey of the truck semi-trailer 22 commences.

Figure 7A:
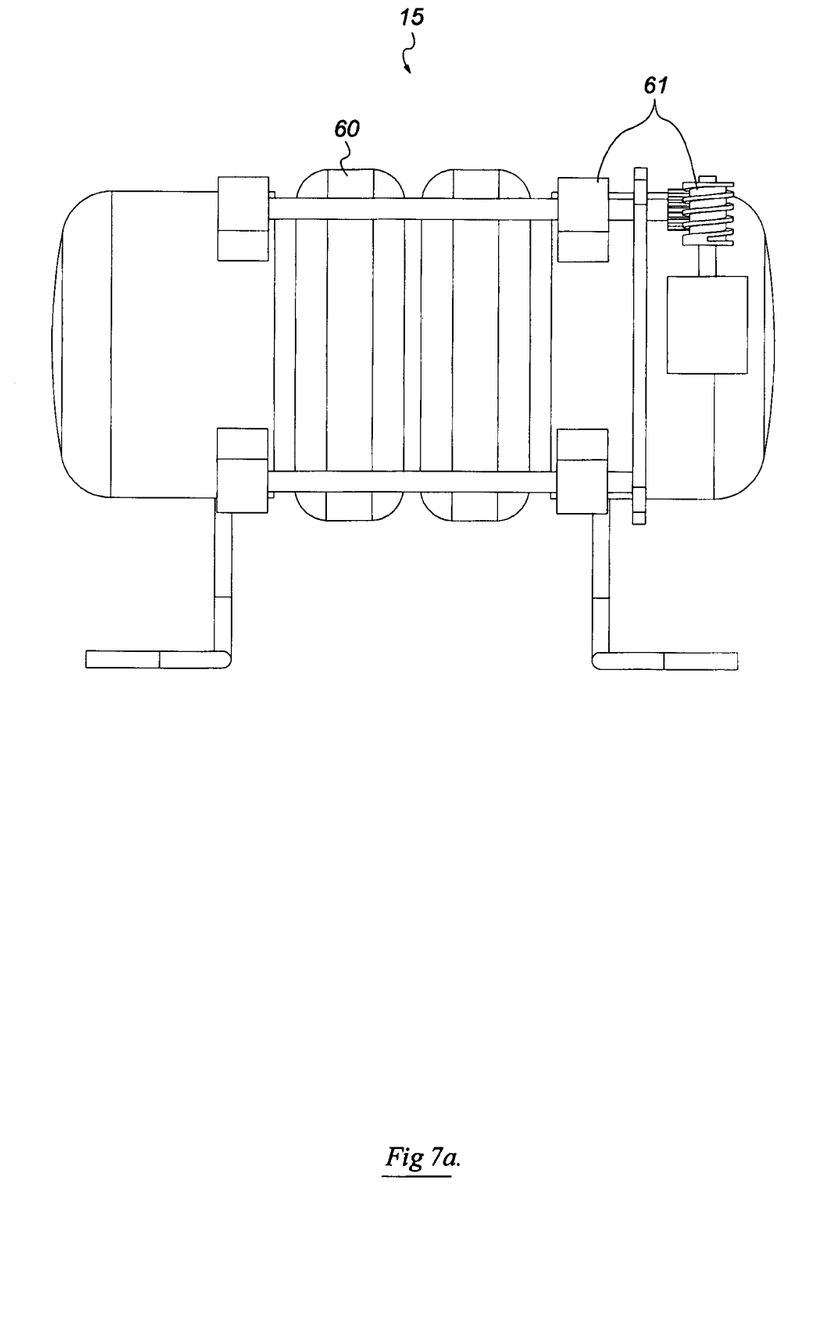
FIG. 7a is an enlarged elevation view of a variable volume reservoir for use with the self-steering bogie shown in FIG. 2.
Figure 7B:
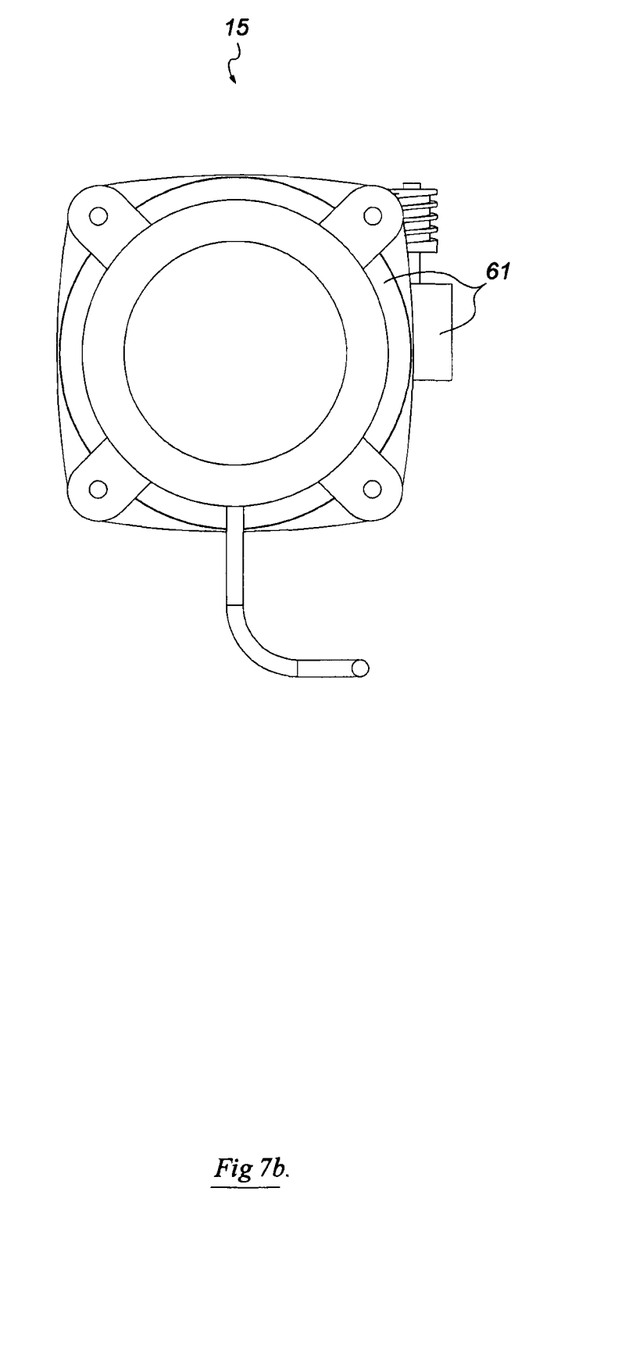

Variable volume reservoir 15 in this embodiment comprises a bellows type vessel 60 made of flexible and expandible material, such as rubber, whose size and therefore internal volume may vary. The variable volume may be achieved by a motorised mechanism 61 connected externally of vessel 60, and which is able to extend and contract vessel 60.

Variable volume reservoir 15 is also used to deliver air to springs 5a-5d via a pressure proportionator (not shown), and the amount of air delivered will vary depending on the payload of semi-trailer 24. Variable volume reservoir 15 is recharged with air from main reservoir 26 as required.

Variable volume reservoir 15 also preferably serves another role. Differing road conditions can vary resistance to tyre tread shear force. For example, loose gravel on a road delivers less resistance to tyre tread shear force, and therefore the pressures for full deflection are significantly less. As such it is necessary to reduce pressure by varying the volume of reservoir 15 by expanding vessel 60 and bleeding off air from springs 5a-5d, when operating on a loose gravel road surface. In use a driver (not shown) in the cabin of prime mover 23 could manually activate an electronic control (not shown) operably connected to ECU 50 to adjust/vary volume of reservoir 15 to suit loose gravel conditions.

For cruising speeds above say 70 km/h and also for reversing, a steering lock 27 actuated by a solenoid (not shown) is used to lock rotational restraint assembly 25/turntable 18. Such lock 27 could for example be a "simple bar" extending between one of the upper brackets 19a into a female receptacle on a lower bracket 19b. Such steering lock 27 is operably connected to ECU 50 and can be remotely triggered by the driver from the cabin of prime mover 23.

Operation of bogie 30 and in particular rotational restraint assembly 25 will now be described. As semi-trailer 24 is towed by prime mover 23 through a curve following a straight, the increasing angle that the longitudinal axis of semi-trailer 24 makes with bogie 30 having a tendency to roll straight ahead, generates a resistant torque as a result of air springs 5a-5d (of rotational restraint assembly 25) being compressed.

Under "adiabatic compression" which will typically take place over a few seconds, pressure inside springs 5a-5d rises markedly until about 38° deflection is achieved, and a ten-to-twelve fold increase in pressure is reached. This significant ten-to-twelve fold increase in pressure is approximately the amount of pressure required to achieve the resistance which is necessary for the balance of the two conflicting torque forces such that bogie 30 will track in the path of semi-trailer 24, shown by direction arrow T in FIG. 9. This tracking of bogie 30 significantly improves the "swept path performance" of this articulated vehicle as compared to the prior art truck.

Figure 2:
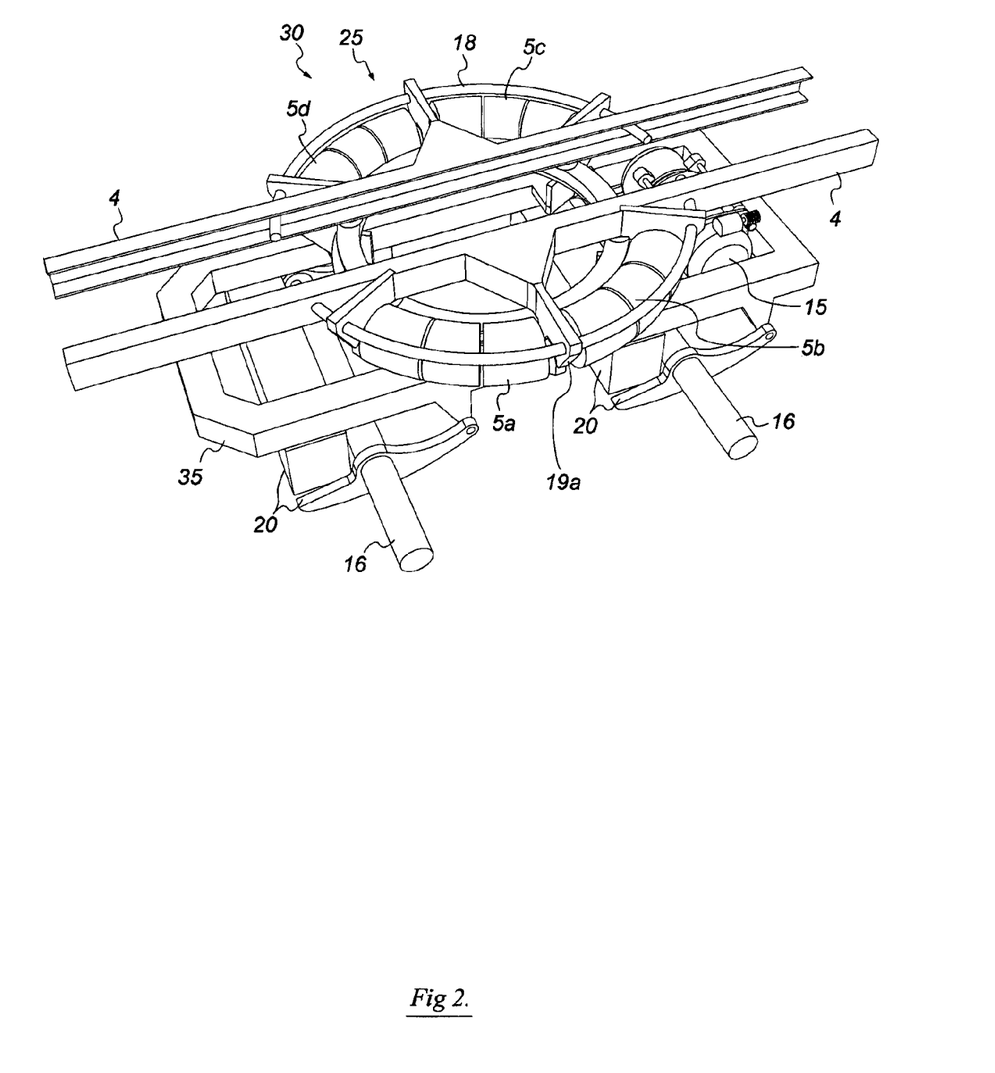
FIG. 2 is a perspective view of a self-steering bogie assembly where the tandem axles are in a straight ahead orientation, in accordance with a preferred embodiment of the invention.

In use the "relaxed" springs 5a-5d as shown in FIG. 2 in straight ahead orientation of tandem axles 16, will become fully compressed during rotated orientation see FIG. 3, to occupy approximately one third their "relaxed" circumferential arc length, say about 230 mm, and thus create the requisite ten-to-twelve fold increase in pressure which is borne by upper and lower brackets 19a, 19b.

An example of the forces involved is as follows. The "torsional moment" that must be developed for rotation at maximum load is about 60,000 ft·lb, which is determined from lateral steering forces in short-wheel base prime mover 23. This means that each "quadrant" spring 5a-5d must develop about 15,000 ft·lb or (6750 lb of thrust), which is within the upper limits of permissible pressure. As this is a result of adiabatic expansion, it requires an initial pressure of (for straight ahead) 63 lb/in$^2$ for a developed force of 2650 lb (expansion ratio is 2.85).

It should be understood that all of the abovementioned brackets 19a,19b and any spacers, should in design preferably have positive restraints such as bolts and nuts, mating protrusions and recess surfaces, which effectively allow for them to engage with springs 5a-5d in both expansion and compression without misalignment or unwanted deformation. Furthermore, concertina style protectors (not shown) will preferably be used on slidable components such as rails and brackets etc.

Furthermore it should be understood that the air connection between air springs 5a-5d and reservoir 15 is initially open when the driver allows the correct pressure from the proportionator for the particular pay load status. However, preferably the proportionator will be isolated by a valve (not shown), and from then on during operation the air springs 5a-5d are open collectively in their connection to variable volume reservoir 15, which attenuates the pressure increases caused by adiabatic compression associated with rotation of bogie 30.

Because of the high polar moment of inertia against yaw movement, in the instance of a sudden impact at speed against a bump or sharp depression in the road, affecting the wheels on one side only, the rotational displacement of bogie 30 will be severely restricted. If the inertial factor is not sufficient, hydraulic damping using a damper (not shown) with a steep response curve can be applied. This is an effective option because allowable rotational displacement typically takes a minimum of 1-3 seconds, whereas unwanted displacement takes only about 0.0-0.2 seconds. Of course, the adiabatic compression of air in springs 5a-5d will also work to restore aberrant excursions, albeit to only a limited degree.

An explanation of determining pressures in the rotational restraint assembly 25 is as follows.

At the commencement of any journey, the payload and prospective road conditions are assessed by the driver of semi-trailer truck 22 aided by load monitoring and pre-programmed requisite pressure for rotational restraint assembly 25.

Thus while bogie 30 is in a straight ahead position, the correctly factored (load & road condition) pressure is firstly set within the system of air suspension 20, and then in air springs 5a-5d via reservoir 15, using the bleed valve of main reservoir 26. This is achieved through the vehicle's conventional "load monitoring system" which is operably connected to ECU 50 and the driver's input to the electronic control unit (not shown but connected to ECU 50) for the road condition, say for example "normal", "loose gravel" or "wet/rain" etc. This means that the correctly factored pressures are set for that journey, so that undisturbed adiabatic expansion/compression of springs 5a-5d take care of all forward self-steering of bogie 30.

For basic simple reversing, prime mover 23 and semi-trailer 24 are run "straight" and bogie 30 is locked using steering lock 27. Reversing is then the same as for a rigid bogie.

It should be understood that whilst the abovementioned preferred embodiment is directed to an articulated road vehicle, it should be understood that self steering bogie 30 could be employed on an elongate road vehicle which is not necessarily articulated, but having at least a first axle assembly at the front end of the vehicle and one or more trailing axle assemblies disposed on the on the structural frame of the vehicle behind the first axle assembly. One such elongate road vehicle is a bus (or coach) and self-steering bogie 30 could be employed on a trailing tandem axle assembly of such a bus.

For ease of reference in the claims, any reference to "truck" is understood to mean a "prime mover" and any reference to "trailer" is understood to mean a "semi trailer".

The terms "comprising" and "including" (and their grammatical variations) as used herein are used in inclusive sense and not in the exclusive sense of "consisting only of".

The invention claimed is:

1. A self-steering bogie for a trailer towed by a truck, said trailer with at least two longitudinal members parallel to the longitudinal axis of said trailer, said bogie comprising:
a rotatable sub-frame borne on tandem axles with associated wheels which supports the rear end of said trailer by means of a load bearing turntable, wherein a rotational restraint assembly is mounted on said turntable and which in part interconnects said sub-frame, said longitudinal members, and an upper portion of said turntable, said rotational restraint assembly having at least four compression air springs disposed circumferentially in said turntable, wherein when said trailer is towed by said truck through a curve following a straight ahead direction, the increasing angle that the longitudinal axis of said trailer makes with said bogie having a tendency to roll straight ahead generates a resistant torque as a result of which said compression air springs are compressed simultaneously, thereby providing resistance sufficient such that said bogie will track in the path of said trailer.

2. A self-steering bogie as claimed in claim 1, wherein each compression air spring is associated with a quadrant of said turntable.

3. A self-steering bogie as claimed in claim 1, wherein said upper portion of said turntable is rigidly attached to said two longitudinal members and a lower portion of said turntable is connected to said sub-frame, and said lower portion of said turntable is rotatable with respect to said upper portion of said turntable.

4. A self-steering bogie as claimed in claim 3, wherein a plurality of spaced apart upper brackets are disposed on said upper portion of said turntable, and a plurality of lower brackets are disposed on said lower portion of said turntable, and said compression air springs are constrained to compress by said upper brackets and said lower brackets.

5. A self-steering bogie as claimed in claim 4, wherein at least one first upper outer rail is disposed substantially circumferentially on said upper portion of said turntable, and at least one second inner rail is disposed substantially circumferentially on said lower portion of said turntable, and said at least one first upper outer rail is used to slidably constrain one or more upper brackets and said at least one second lower inner rail is used to slidably constrain one or more lower brackets.

6. A self-steering bogie as claimed in claim 1, wherein said compression air springs are operably connected to a variable volume air reservoir, and in use said compression air springs are open collectively in their connection to said variable volume reservoir, in order to attenuate the pressure increases caused by adiabatic compression associated with bogie rotation.

7. A self-steering bogie as claimed in claim 6, wherein said variable volume reservoir has air delivered to it from a main air reservoir of said vehicle.

8. A self-steering bogie as claimed in claim 6, wherein said variable volume reservoir is operably connected to an electronic control unit which controls the amount of air delivered to said compression air springs as a function of trailer payload and/or road condition.

9. A self-steering bogie as claimed in claim 6, wherein said variable volume reservoir is operably connected to an air suspension system of said bogie via a pneumatic circuit.

10. A self-steering bogie as claimed in claim 8, wherein said electronic control unit is operably connected to a steering lock mechanism disposed on said rotational restraint assembly.

11. A self-steering bogie as claimed in claim 1, wherein each of said compression air springs are substantially made of a flexible material.

12. A self-steering bogie for an elongate road vehicle having at least a first axle assembly at the front end of said vehicle and at least one trailing axle assembly disposed on said vehicle behind said first axle assembly, and said trailing axle assembly is a set of tandem axles with associated wheels disposed below a structural frame of said vehicle, said bogie comprising:
a rotatable sub-frame borne on said set of tandem axles which supports said vehicle by means of a load bearing turntable, wherein a rotational restraint assembly is mounted on said turntable and which in part interconnects said sub-frame, said structural frame, and an upper portion of said turntable, said rotational restraint assembly having at least four compression air springs disposed circumferentially in said turntable, wherein when said elongate road vehicle moves through a curve following a straight ahead direction, the increasing angle that the longitudinal axis of said vehicle makes with said bogie having a tendency to roll in said straight ahead direction generates a resistant torque as a result of which said compression air springs are compressed simultaneously, thereby providing resistance sufficient such that said bogie will track in the path of said vehicle.

13. A self-steering bogie as claimed in claim 12, wherein each compression air spring is associated with a quadrant of said turntable.

14. A self-steering bogie as claimed in claim 12, wherein said upper portion of said turntable is rigidly attached to said structural frame of said vehicle and a lower portion of said turntable is connected to said sub-frame, and said lower portion of said turntable is rotatable with respect to said upper portion of said turntable.

15. A self-steering bogie as claimed in claim 14, wherein a plurality of spaced apart upper brackets are disposed on said upper portion of said turntable, and a plurality of lower brackets are disposed on said lower portion of said turntable, and said compression air springs are constrained to compress by said upper brackets and said lower brackets.

16. A self-steering bogie as claimed in claim 15, wherein at least one first upper outer rail is disposed substantially circumferentially on said upper portion of said turntable, and at least one second inner rail is disposed substantially circumferentially on said lower portion of said turntable, and said at least one first upper outer rail is used to slidably constrain one or more upper brackets and said at least one second lower inner rail is used to slidably constrain one or more lower brackets.

17. A self-steering bogie as claimed in claim 12, wherein said compression air springs are operably connected to a variable volume air reservoir, and in use said compression air springs are open collectively in their connection to said variable volume reservoir, in order to attenuate the pressure increases caused by adiabatic compression associated with bogie rotation.

18. A self-steering bogie as claimed in claim 17, wherein said variable volume reservoir has air delivered to it from a main air reservoir of said vehicle.

19. A self-steering bogie as claimed in claim 18, wherein said variable volume reservoir is operably connected to an electronic control unit which controls the amount of air delivered to said compression air springs.

20. A self-steering bogie as claimed in claim 19, wherein said electronic control unit is operably connected to a steering lock mechanism disposed on said rotational restraint assembly.

21. A self-steering bogie as claimed in claim 12, wherein each of said compression air springs are substantially made of a flexible material.

22. A self-steering bogie as claimed in claim 12, wherein said elongate road vehicle is an articulated road vehicle having a truck and a trailer, and said first axle assembly at the front end of said vehicle is on said truck, and said trailing axle assembly is on said trailer.

23. A self-steering bogie as claimed in claim 12, wherein said elongate road vehicle is a bus.

24. A self-steering bogie as claimed in claim 12, wherein said rotatable sub-frame is capable of rotating through about 40° either side of straight ahead as said compression air springs are being compressed.

25. A self-steering bogie as claimed in claim 1, wherein said rotatable sub-frame is capable of rotating through about 40° either side of straight ahead as said compression air springs are being compressed.

* * * * *